United States Patent
Byun et al.

(10) Patent No.: US 8,748,033 B2
(45) Date of Patent: Jun. 10, 2014

(54) BATTERY PACK EXHIBITING IMPROVED INSULATION PERFORMANCE AND ASSEMBLY PRODUCTIVITY

(75) Inventors: Bohyun Byun, Suwon-si (KR); Jongpil Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 575 days.

(21) Appl. No.: 12/645,227

(22) Filed: Dec. 22, 2009

(65) Prior Publication Data

US 2010/0159313 A1 Jun. 24, 2010

(30) Foreign Application Priority Data

Dec. 22, 2008 (KR) .................. 10-2008-0131467

(51) Int. Cl.
*H01M 2/04* (2006.01)

(52) U.S. Cl.
USPC .......................................... 429/175; 429/129

(58) Field of Classification Search
USPC ............... 429/100, 7, 72, 175, 181, 158, 127, 429/130, 123, 176, 129; 361/104, 106
See application file for complete search history.

(56) References Cited

U.S. PATENT DOCUMENTS

| | | | |
|---|---|---|---|
| 2003/0077484 A1 | 4/2003 | Cho | |
| 2005/0112456 A1 | 5/2005 | Kozu et al. | |
| 2005/0208345 A1* | 9/2005 | Yoon et al. | 429/7 |
| 2006/0099494 A1* | 5/2006 | Jung et al. | 429/72 |
| 2008/0118825 A1 | 5/2008 | Yoon | |
| 2008/0233472 A1 | 9/2008 | Ota et al. | |
| 2010/0143793 A1* | 6/2010 | Yamamoto | 429/175 |

FOREIGN PATENT DOCUMENTS

| | | |
|---|---|---|
| CN | 101192658 | 6/2008 |
| EP | 1 926 160 A1 | 5/2008 |
| JP | 2002-343315 | 11/2002 |
| JP | 2003-031193 | 1/2003 |
| JP | 2004-273174 | 9/2004 |
| JP | 2006-156326 | 6/2006 |
| JP | 2006-164559 | 6/2006 |
| JP | 2006-331818 | 12/2006 |
| JP | 2006-331819 | 12/2006 |
| JP | 2007-141805 | 6/2007 |
| JP | 2008-300245 | 12/2008 |
| KR | 2004-0085155 | 10/2004 |

(Continued)

OTHER PUBLICATIONS

Notice of Allowance dated Feb. 17, 2011 for corresponding Korean Patent Application No. 10-2008-0131467.

(Continued)

*Primary Examiner* — Kenneth Douyette
(74) *Attorney, Agent, or Firm* — Knobbe Martens Olson & Bear LLP (57) ABSTRACT

A battery pack is provided. The battery pack comprises a bare cell, a protective circuit board electrically connected to the bare cell to control the charge/discharge of the bare cell, a secondary protective device connected between the bare cell and the protective circuit board and installed on one surface of the bare cell, and an insulating member disposed on the one surface of the bare cell and having a width greater than that of the secondary protective device. Due to this construction, the insulation performance of the secondary protective device is improved and the assembly of the insulating member is facilitated.

13 Claims, 5 Drawing Sheets

(56) References Cited

FOREIGN PATENT DOCUMENTS

| KR | 1020040085155 | 10/2004 |
| KR | 1020070091880 | 9/2007 |
| WO | WO 2008/066287 | 6/2008 |

OTHER PUBLICATIONS

Extended EP Search Report dated Mar. 31, 2011 for corresponding EP Application No. 09252860.3.

Office Action dated Dec. 19, 2011 for corresponding CN Application No. 200910261051.9.

Office Action dated Oct. 23, 2012 for corresponding JP Application No. 2009-255298.

Office Action dated Sep. 3, 2013 for corresponding JP Application No. 2009-255298.

* cited by examiner

BATTERY PACK EXHIBITING IMPROVED INSULATION PERFORMANCE AND ASSEMBLY PRODUCTIVITY

CROSS-REFERENCE TO RELATED APPLICATION

This application claims the benefit of Korean Application No. 10-2008-0131467, filed on Dec. 22, 2008 in the Korean Intellectual Property Office, the disclosure of which is incorporated herein by reference.

BACKGROUND OF THE INVENTION

1. Field of the Invention

Aspects of the present invention relate to a battery pack. More specifically, aspects of the present invention relate to a battery pack that is specially designed to achieve improved insulation performance and assembly productivity.

2. Description of the Related Art

Compact and lightweight portable electrical/electronic devices, including cellular phones, notebook computers and camcorders, are being actively developed and produced at present. These portable electrical/electronic devices can be operated even in places where no power supply is available because battery packs are embedded therein. Most commercially available battery packs employ secondary batteries capable of repeatedly charging and discharging as they are more economically efficiency. Representative examples of such secondary batteries include nickel-cadmium (Ni—Cd) batteries, nickel-hydrogen (Ni—MH) batteries, lithium batteries, and lithium ion secondary batteries. Of these, the operating voltage of lithium ion secondary batteries is about three times as high as the operating voltages of nickel-cadmium batteries and nickel-hydrogen batteries that are commonly used as power supplies of portable electronic devices. Lithium ion secondary batteries are widely used due to their high energy density per unit weight.

A typical secondary battery uses a lithium oxide as a positive electrode active material and a carbon material as a negative electrode active material. Secondary batteries are generally classified into liquid electrolyte batteries and polymer electrolyte batteries according to the type of electrolytes used in the batteries. The former type batteries are referred to as 'lithium ion batteries' and the latter type batteries are referred to as 'lithium polymer batteries.'

In such a secondary battery, a bare cell is electrically connected to a protective circuit board. The bare cell is produced by accommodating an electrode assembly and an electrolyte in a can and sealing the can. The bare cell is charged and discharged by chemical reactions and the protective circuit board serves to protect the bare cell from overcharge and overdischarge while controlling the charging/discharging of the bare cell.

An auxiliary secondary protective device may be provided in the secondary battery to detect a sudden change in the temperature or voltage of the bare cell and interrupt a flow of current.

The secondary protective device is installed on the upper surface of the bare cell in order to facilitate the detection of a change in the temperature or voltage of the bare cell. In this case, an insulating member is disposed to electrically insulate the secondary protective device from the bare cell.

SUMMARY OF THE INVENTION

Aspects of the present invention provide a battery pack that uses an insulating member disposed on one surface of a bare cell and having a width greater than that of a secondary protective device connected between the bare cell and a protective circuit board to stably insulate the secondary protective device from the bare cell.

Another aspect of the present invention provides a battery pack that uses an insulating member disposed on one surface of a bare cell and having a width equal to or greater than that of the bare cell to achieve improved assembly productivity.

An embodiment of the present invention provides a battery pack that comprises a bare cell, a protective circuit board electrically connected to the bare cell to control the charge/discharge of the bare cell, a secondary protective device connected between the bare cell and the protective circuit board and installed on one surface of the bare cell, and an insulating member disposed on the one surface of the bare cell and having a width greater than that of the secondary protective device.

According to another aspect of the present invention, the insulating member may be smaller in width than the one surface of the bare cell. Preferably, the width of the insulating member is at least 51% of the one surface of the bare cell.

According to another aspect of the present invention, the insulating member may have the same width as the one surface of the bare cell.

According to another aspect of the present invention, the insulating member may be greater in width than the one surface of the bare cell. Preferably, the width of the insulating member is 109% or less than that of the one surface of the bare cell.

According to another aspect of the present invention, the insulating member is preferably in the form of a tape.

According to another aspect of the present invention, the secondary protective device is preferably selected from positive temperature coefficient (PTC) thermistors, thermal fuses, and equivalents thereof.

According to another aspect of the present invention, the battery pack preferably further comprises a cover case provided on the bare cell to accommodate the protective circuit board.

According to another aspect of the present invention, the cover case is preferably formed with interference-preventing holes to prevent interference with the insulating member installed on the one surface of the bare cell.

According to another aspect of the present invention, the bare cell is formed with an area on the one surface thereof where the insulating member is disposed.

According to another aspect of the present invention, the area is preferably a recessed portion whose width is smaller than that of the one surface of the bare cell or a stepped portion whose width is the same as that of the one surface of the bare cell.

According to another aspect of the present invention, the bare cell preferably has an open surface closed by a cap plate.

According to another aspect of the present invention, the battery pack preferably further comprises a label surrounding the side surfaces other than the one surface of the bare cell.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
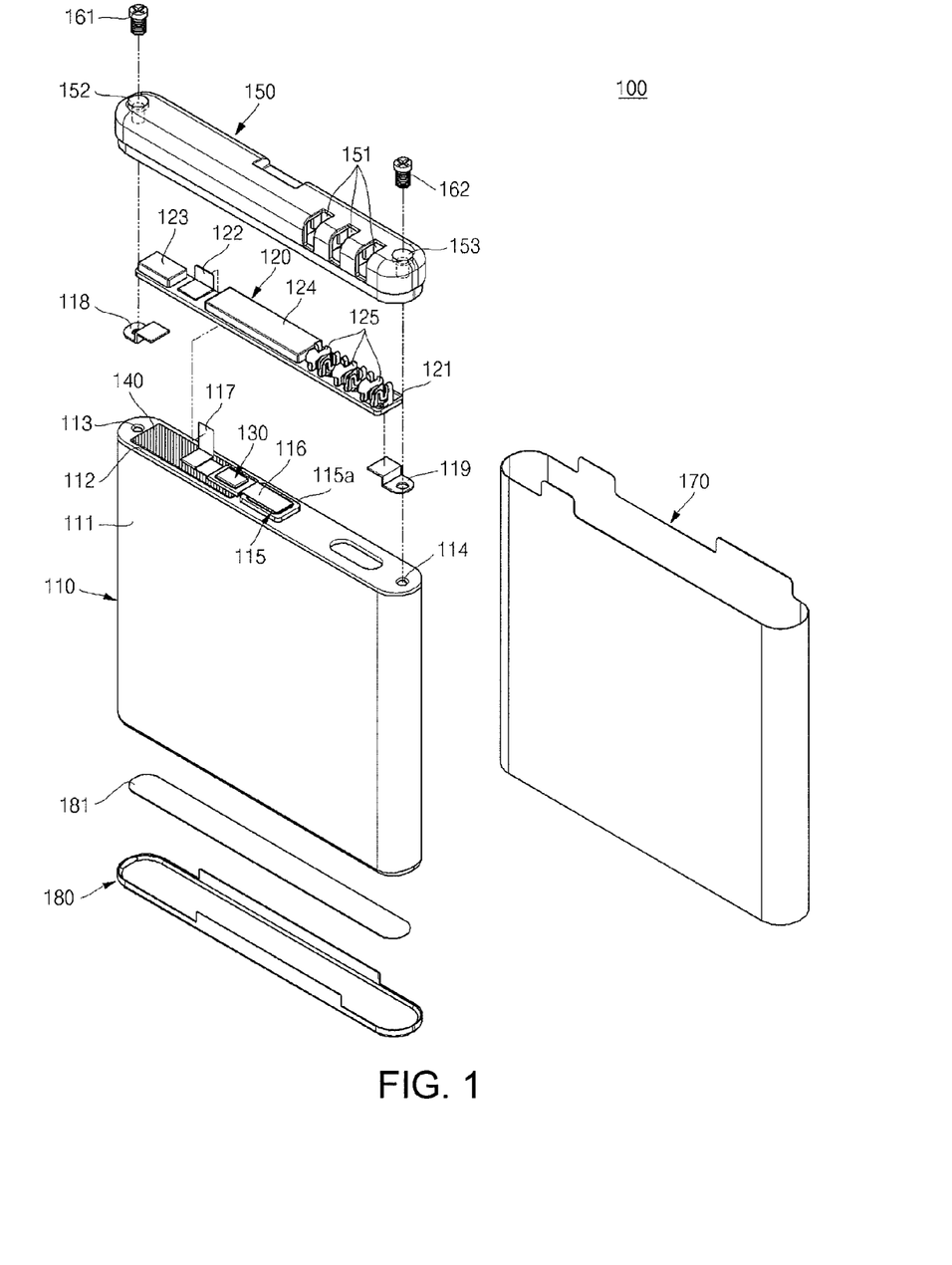
FIG. 1 is an exploded perspective view of a battery pack according to an embodiment of the present invention.
Figure 2:
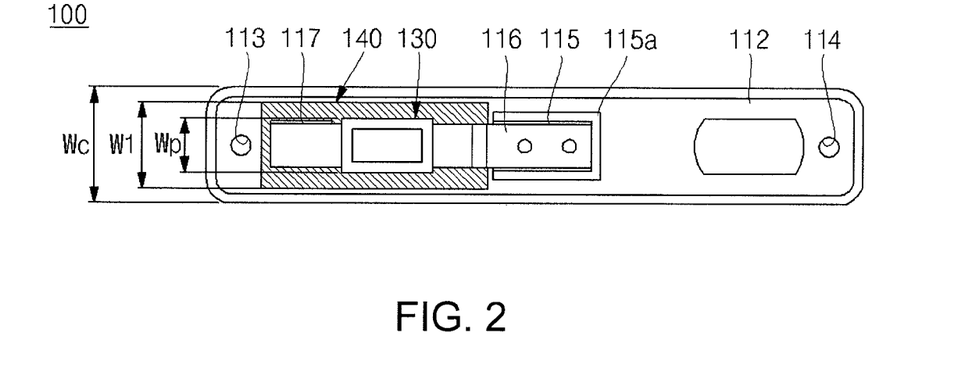
FIG. 2 is a plan view illustrating a state in which a secondary protective device is seated on the upper surface of a cap plate in the battery pack of FIG. 1.
Figure 3:
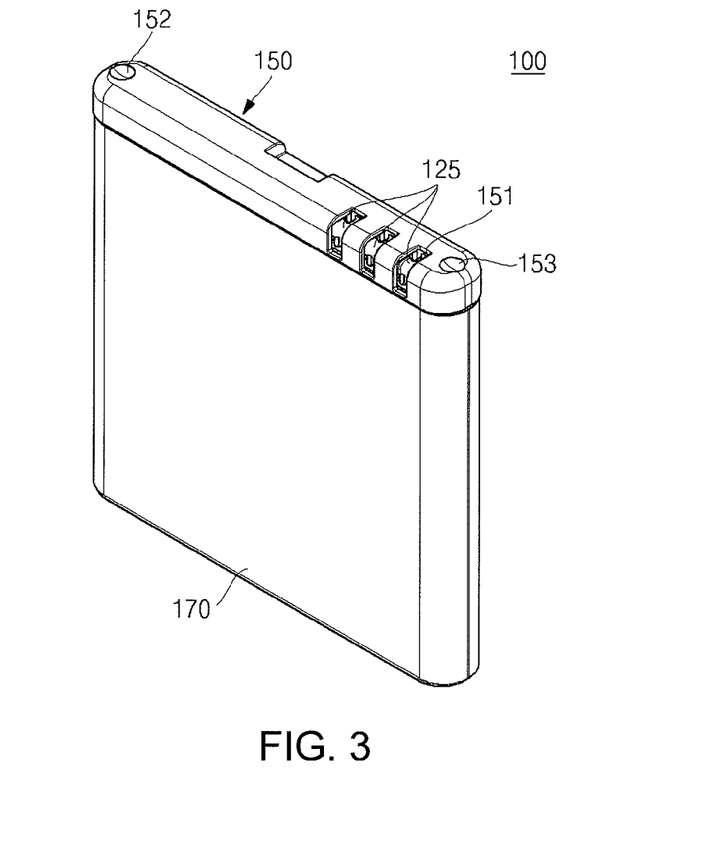
FIG. 3 is a perspective view illustrating the appearance of the battery pack of FIG. 1 after assembly.

FIG. 1 is an exploded perspective view of a battery pack according to an embodiment of the present invention, FIG. 2 is a plan view illustrating a state in which a secondary protective device is seated on the upper surface of a cap plate in the battery pack, and FIG. 3 is a perspective view illustrating the appearance of the battery pack after assembly.

As illustrated in FIGS. 1 through 3, the battery pack 100 comprises a bare cell 110, a protective circuit board 120 electrically connected to the bare cell 110, a secondary protective device 130 installed in an area where the bare cell 110 is electrically connected to the protective circuit board 120, and an insulating member 140 disposed in an area of the upper surface of the bare cell 110 where the secondary protective device 130 is installed. The battery pack further comprises a cover case 150, first and second screws 161 and 162 fastening the cover case 150 to the bare cell 110, and a label 170 surrounding the outer circumference of the bare cell 110.

The bare cell 110 includes an electrode assembly (not shown) and a can 111 having an open end. The electrode assembly is produced by rolling a positive electrode plate (not shown), a negative electrode plate (not shown) and a separator (not shown). The electrode assembly is accommodated in the can 111 through the opening of the can 111. A cap plate 112 is welded to the opening of the can 111 to seal the can 111. The bare cell 110 has first and second coupling recesses 113 and 114 at right and left ends of the upper surface of the cap plate 112. An electrode terminal 115 insulated with an insulating member 115a is installed at a center of the cap plate 112. With this configuration, the positive electrode of the electrode assembly of the bare cell 110 can be electrically connected to the can 111 or the cap plate 112 and the negative electrode of the electrode assembly can be electrically connected to the electrode terminal 115. The positive electrode connected to the cap plate 112 and the negative electrode connected to the electrode terminal 115 may be reversed in polarity.

The protective circuit board 120 is electrically connected to the bare cell 110. A negative electrode of the protective circuit board 120 is connected to the electrode terminal 115, which is a negative electrode of the bare cell 110, by a first lead tab 116. A positive electrode of the protective circuit board 120 is connected to the cap plate 112, which is a positive electrode of the bare cell 110, by first and second lead plates 118 and 119. The first and second lead plates 118 and 119 are welded in such a manner that both ends of the protective circuit board 120 are supported.

The protective circuit board 120 includes an insulating substrate 121, a printed circuit pattern (not shown), a conductive pad 122, protective circuit parts 123 and 124, and charge/discharge terminals 125. The insulating substrate 121 is a printed circuit board having a plurality of printed circuit patterns formed thereon. The conductive pad 122 is connected to a second lead tab 117. The second lead tab 117 is connected to the first lead tab 116, which is connected to the electrode terminal 115. Passive devices (e.g., resistors and capacitors), active devices (e.g., field-effect transistors), safety devices (e.g., PTC thermistors) and integrated circuits can be selectively provided in the protective circuit parts 123 and 124. The charge/discharge terminals 125 are passages through which a current flows inside and outside the battery during charging and discharging of the battery.

The secondary protective device 130 is electrically connected between the negative electrode of the protective circuit board 120 and the electrode terminal 115. The secondary protective device 130 serves to interrupt the electrical connection between the bare cell 110 and the protective circuit board 120 upon an excessive increase in the temperature or current of the bare cell 110. The kind of the secondary protective device 130 may be selected from PTC thermistors, thermal fuses, and equivalents thereof.

The insulating member 140 is attached to the upper surface of the bare cell 110. The secondary protective device 130 is positioned on the upper surface of the insulating member 140. With this arrangement, the bare cell 110 is insulated from the secondary protective device 130 by the insulating member 140. There is no restriction on the shape and material of the insulating member 140. It is preferred that the insulating member 140 is a tape made of an insulating material.

The insulating member 140 has a width W1 greater than the width Wp of the secondary protective device 130. It is preferable that the insulating member 140 has a width sufficient for the secondary protective device 130 to be easily installed on the upper surface of the insulating member 140 in assembling the secondary protective device 130 on the upper surface of the bare cell 110.

The width W1 of the insulating member 140 is smaller than the width Wc of the cap plate 112 forming the upper surface of the bare cell 110. That is, the width W1 of the insulating member 140 is greater than the width Wp of the secondary protective device but is smaller than the width Wc of the cap plate 112. Preferably, the width W1 of the insulating member 140 is at least 51% of the width Wc of the cap plate 112. When W1 is not at least 51% of Wc, it is difficult to attach the insulating member 140 to the cap plate 112 and it is also difficult to attach the secondary protective device to the upper surface of the insulating member 140.

The cover case 150 is coupled to an upper portion of the bare cell 110 while accommodating the protective circuit board 120 therein. The cover case 150 protects the protective circuit board 120 against external contacts and impacts. Charge/discharge terminal holes 151 are formed at one side of the cover case 150. The charge/discharge terminals 125 protrude from the cover case 150 through the respective charge/discharge terminal holes 151. First and second screw mounting holes 152 and 153 are formed at right and left ends of the cover case 150. The first and second screws 161 and 162 are fitted into the first and second screw mounting holes 152 and 153, penetrate the first and second lead plates 118 and 119 supporting the protective circuit board 120, and are fixedly fitted into the first and second coupling recesses 113 and 114 formed in the cap plate 112 of the bare cell 110, respectively, to fasten the protective circuit board 120 and the cover case 150 to the upper surface of the bare cell 110, i.e. the upper surface of the cap plate 112. The cover case 150 is produced by injection molding of polycarbonate or its equivalent.

The label 170 substantially surrounds the side surfaces of the bare cell 110. The label 170 also covers the boundary between the bare cell 110 and the cover case 150 to effectively fix the cover case 150 to the bare cell 110.

An auxiliary case 180 is coupled to the lower surface of the bare cell 110. The auxiliary case 180 is coupled so as to surround the lower end edges of the bare cell 110 to absorb an impact on the edges when the battery falls. A double-sided tape 181 is attached to the lower surface of the bare cell 110 to improve the coupling between the auxiliary case 180 and the bare cell 110.

The battery pack 100 is assembled by the following procedure.

First, the electrode assembly is accommodated in the can 111 through the opening of the can 111. The opening is closed by a cap assembly (not shown) including the cap plate 112. After an electrolyte is injected into the can 111 through an electrolyte injection hole (not shown) formed in the cap plate 112, the electrolyte injection hole is closed.

Next, the first lead tab 116 provided with the secondary protective device 130 is connected to the electrode terminal 115. The insulating member 140 is previously attached to the upper surface of the cap plate 112. The secondary protective device 130 and the first and second lead tabs 116 and 117 are installed on the upper surface of the insulating member 140. The insulating member 140 has a width W1 greater than the width Wp of the secondary protective device 130 to ensure a stable assembly of the secondary protective device 130 on the insulating member 140. The width W1 of the insulating member 140 is smaller than the width We of the cap plate 112, which facilitates the attachment of the insulating member 140 to the upper surface of the cap plate 112.

Subsequently, the protective circuit board 120, to which the first and second lead plates 118 and 119 are welded, is positioned on the upper surface of the cap plate 112. The second lead tab 117 of the secondary protective device 130 is electrically connected to the conductive pad 122 of the protective circuit board 120.

In a state in which the cover case 150 covers the upper portion of the protective circuit board 120, the first and second screws 161 and 162 are fitted into the first and second screw mounting holes 152 and 153 of the cover case 150, penetrate the first and second lead plates 118 and 119 supporting the protective circuit board 120, and are fixedly fitted into the first and second coupling recesses 113 and 114 formed in the cap plate 112 of the bare cell 110, respectively, to fasten the protective circuit board 120 and the cover case 150 to the upper surface of the cap plate 112, which corresponds to the upper surface of the bare cell 110.

Finally, the double-sided tape 181 is used to attach the auxiliary case 180 to the lower end of the bare cell 110 and the side surfaces of the bare cell 110 are surrounded by the label 170. The upper end portion of the label 170 surrounds the side surfaces of the bare cell 110 and the cover case 150. The label 170 protects the front, rear, left and right sides of the bare cell 110.

Next, a description will be given of a battery pack according to a further embodiment of the present invention.

Figure 4:
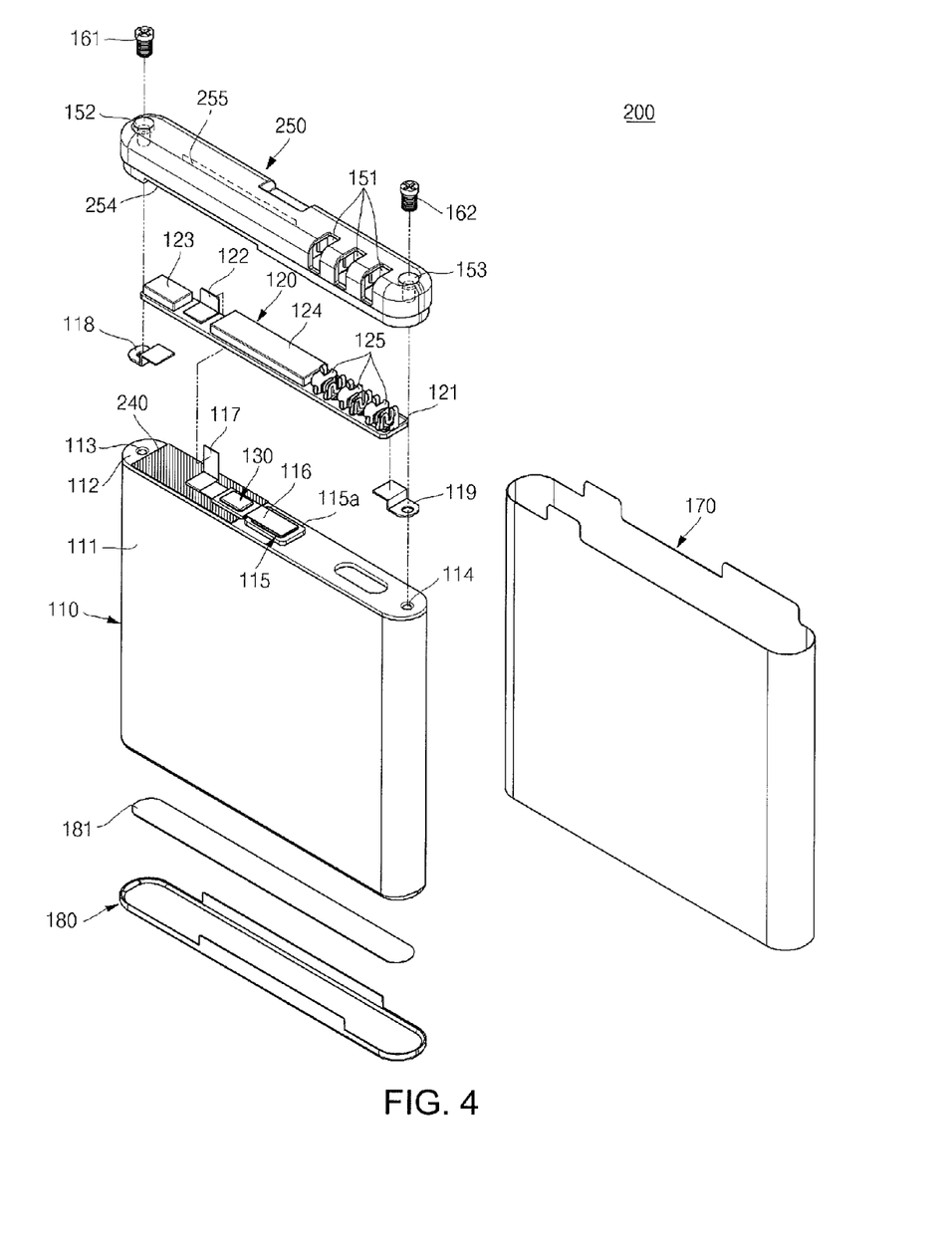
FIG. 4 is an exploded perspective view of a battery pack according to a further embodiment of the present invention.
Figure 5:
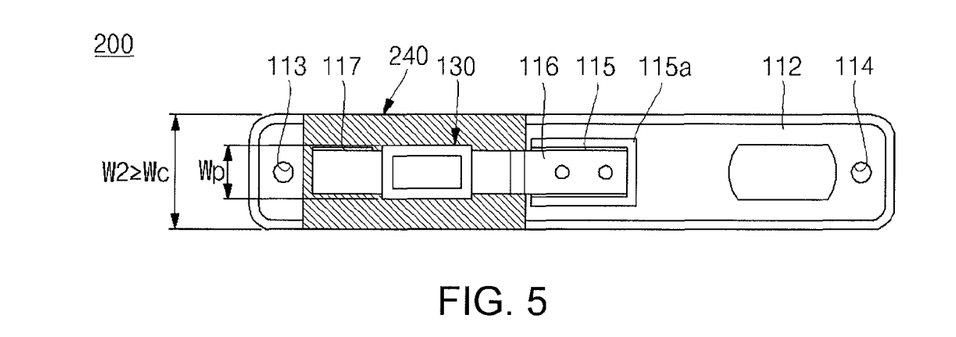
FIG. 5 is a plan view illustrating a state in which a secondary protective device is seated on the upper surface of a cap plate in the battery pack of FIG. 4.
Figure 6:
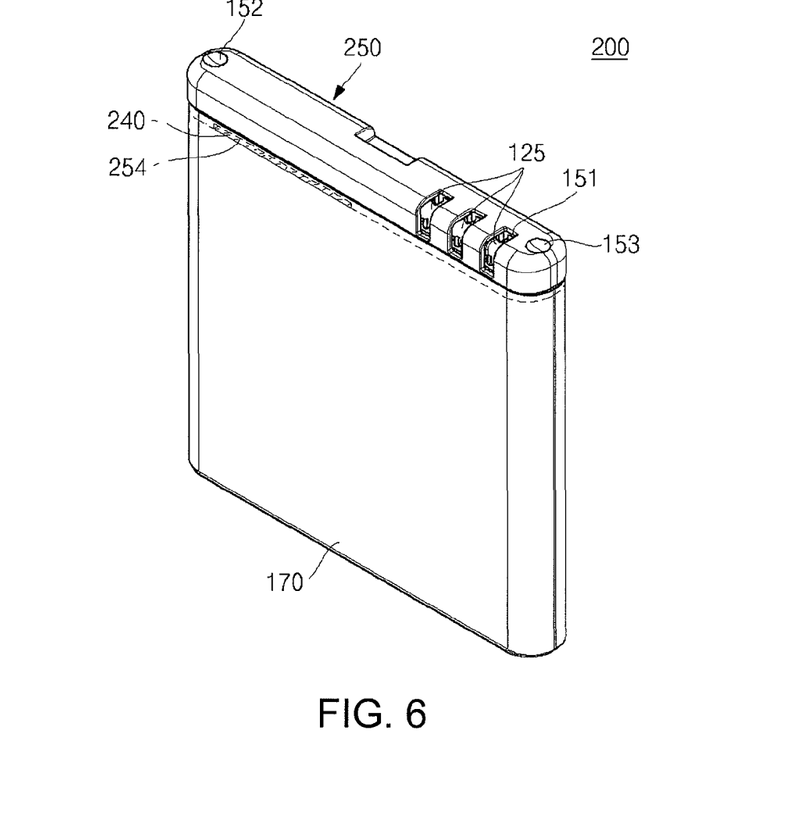
FIG. 6 is a perspective view of the battery pack of FIG. 4 after assembly.

FIG. 4 is an exploded perspective view of the battery pack, FIG. 5 is a plan view illustrating a state in which a secondary protective device is seated on the upper surface of a cap plate in the battery pack, and FIG. 6 is a perspective view of the battery pack after assembly.

Referring to FIGS. 4 through 6, the battery pack 200 comprises a bare cell 110, a protective circuit board 120, a secondary protective device 130 electrically connecting the bare cell 110 and the protective circuit board 120, and an insulating member 240 disposed in an area of the upper surface of the bare cell 110 where the secondary protective device 130 is installed. The battery pack 200 further comprises a cover case 250, first and second screws 161 and 162 fastening the cover case 250 to the bare cell 110, and a label 170 surrounding the outer circumference of the bare cell 110.

The constitution of the battery pack 200 is substantially identical to that of the battery pack 100 except the structures of the insulating member 240 and the cover case 250. The same reference numerals are used to designate elements having the same structure as the elements of the previous embodiment. Detailed explanation of the same elements is omitted in this description.

The insulating member 240 of the battery pack 200 has a width W2 equal to or greater than the width Wc of the upper surface (i.e. the cap plate 112) of the bare cell 110. Preferably, the width W2 of the insulating member 240 may be a maximum of 109% of the width Wc of the cap plate 112.

With these dimensions, the assembly process of the secondary protective device 130 seated on the upper surface of the insulating member 240 is more facilitated. In recent years, there has been much research aimed at the development of batteries that are gradually reduced in size and thickness. In view of the recent trends, there is a need to reduce the width Wc of the upper surface (i.e. the cap plate 112) of the bare cell 110. To fulfill the need, the width W2 of the insulating member 240 may be set to be equal to the width We of the cap plate 112. The same width allows the insulating member 240 to be easily attached to the upper surface of the cap plate 112. Alternatively, the width W2 of the insulating member 240 may be greater than the width Wc of the cap plate 112.

In the case where the width W2 of the insulating member 240 is equal to or greater than the width We of the cap plate 112, the cover case 250 may interfere with the bare cell 110 upon coupling. If the right and left ends of the insulating member 240 interfere with the lower ends of the cover case 250, the first and second screws 161 and 162 may idly rotate or may be fitted to an insufficient depth, and as a result, the protective circuit board 120 and the cover case 250 may not be fastened to the upper surface of the bare cell 110. The cover case 250 has interference-preventing holes 254 and 255 at the right and left sides thereof to prevent interference with the insulating member 240. The interference-preventing holes 254 and 255 are formed at positions corresponding to the positions of the cap plate 112 where the insulating member 240 is disposed.

The assembly procedure of the battery pack 200 is as follows.

First, the electrode assembly is accommodated in the can 111 through the opening of the can 111. The opening is closed by a cap assembly (not shown) including the cap plate 112. After an electrolyte is injected into the can 111 through an electrolyte injection hole (not shown) formed in the cap plate 112, the electrolyte injection hole is closed.

Next, the insulating member 240 is attached to the upper surface of the cap plate 112.

The secondary protective device 130 is electrically connected to the first lead tab 116 and the electrode terminal 115 of the bare cell 110, and is then seated on the upper surface of the insulating member 240.

Subsequently, in a state in which the protective circuit board 120, to which the first and second lead plates 118 and 119 are welded, is positioned on the upper surface of the cap plate 112, the second lead tab 117 of the secondary protective device 130 is electrically connected to the conductive pad 122 of the protective circuit board 120.

Then, the cover case 250 covering the upper portion of the protective circuit board 120 is coupled to the upper surface of the bare cell 110. At this time, the insulating member 240 whose width is equal to greater than that of the cap plate 112 protrudes outwardly from both sides of the cap plate 112 through the interference-preventing holes 254 and 255 of the cover case 250. The interference-preventing holes 254 and 255 allow the cover case 250 to be stably coupled to the upper surface of the bare cell 110 without interfering with the insulating member 240.

In a state where the cover case 250 is placed on the protective circuit board 120, the first and second screws 161 and 162 are fitted into the first and second screw mounting holes 152 and 153 of the cover case 250, penetrate the first and second lead plates 118 and 119 supporting the protective circuit board 120, and are fixedly fitted into the first and second coupling recesses 113 and 114 formed in the cap plate 112 of the bare cell 110, respectively, to completely fasten the protective circuit board 120 and the cover case 250 to the upper surface of the bare cell 110.

Finally, a double-sided tape 181 is used to attach an auxiliary case 180 to the lower end of the bare cell 110 and the side surfaces of the bare cell 110 are surrounded by the label 170. The upper end portion of the label 170 surrounds the side surfaces of the bare cell 110 and the cover case 250 to prevent the interference-preventing holes 254 and 255 of the cover case 250 from being exposed to the outside.

Figure 7A:
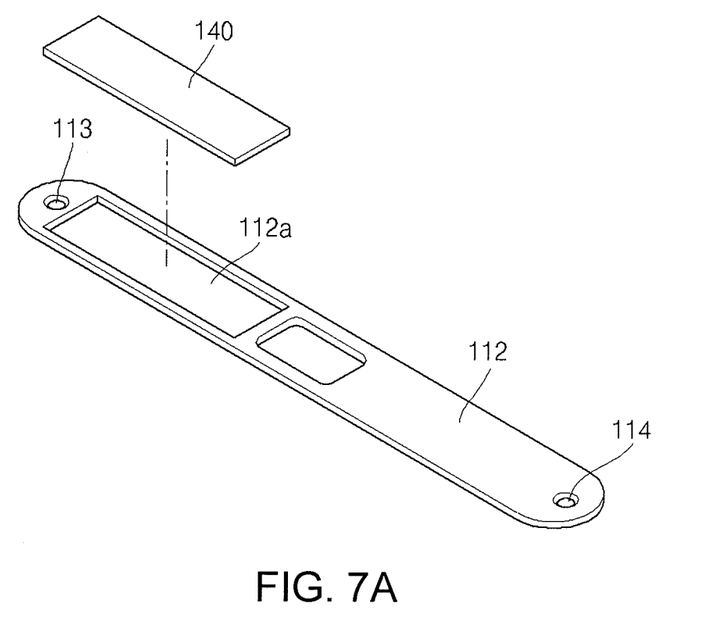
FIG. 7A is a perspective view illustrating a state in which an insulating member is attached to a cap plate in the battery pack of FIG. 1.
Figure 7B:
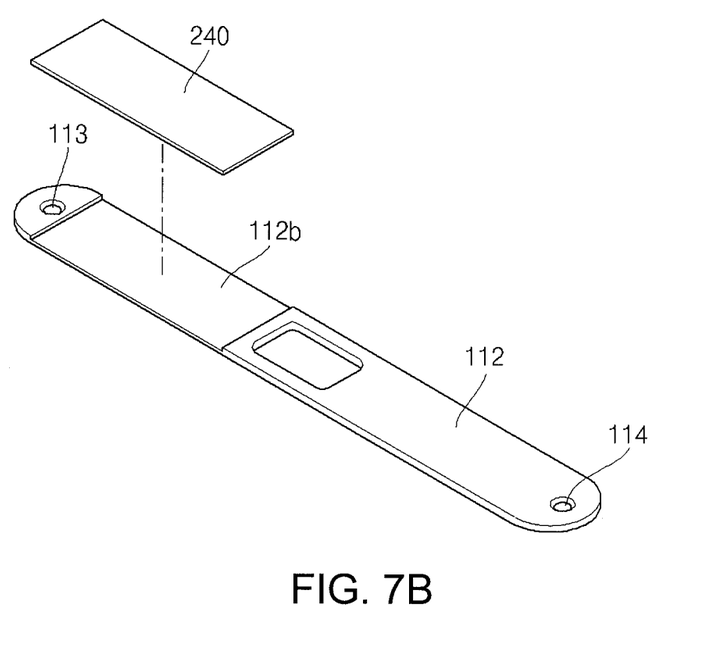
FIG. 7B is a perspective view illustrating a state in which an insulating member is attached to a cap plate in the battery pack of FIG. 4.

FIGS. 7A and 7B are perspective views illustrating the cap plates 112 of the battery packs 100 and 200 according to the embodiments of the present invention.

As illustrated in FIG. 7A, the cap plate 112 has a recessed portion 112a on which the insulating member 140 is seated. The recessed portion 112a is formed at an inner portion of the upper surface of the cap plate 112 and is spaced apart from the edges of the cap plate 112 so that the insulating member 140 whose width W1 is smaller than the width Wc of the cap plate 112 can be accurately attached at a desired position of the cap plate 112.

As illustrated in FIG. 7B, the cap plate 112 has a stepped portion 112b on which the insulating member 240 is seated. The stepped portion 112b is formed at a portion of the upper surface of the cap plate 112 and extends from the edges of the cap plate 112 so that it is easy to choose a position where the insulating member 240 whose width is equal to or greater than the width Wc of the cap plate 112 is attached.

As described above, each of the battery packs according to the embodiments of the present invention is constructed such that the insulating member 140 or 240 is attached to the cap plate 112. In reality, this construction turned out to significantly reduce the number of defective battery packs. Specifically, 74,000 defective battery packs were found in a total of 16,500,000 battery packs, which is close to 4,500 ppm, in the prior art, whereas tests of defective battery packs employing the constitution of the present invention were found to have a failure rate of about 500 ppm.

As is apparent from the above description, in the battery pack of these aspects of the present invention, the insulating member is formed so as to be wider than the secondary protective device installed on one surface of the bare cell to stably insulate the secondary protective device from the bare cell.

In addition, the insulating member is formed so as to have a width equal to or greater than the bare cell to insulate the secondary protective device from the bare cell as well as to achieve improved assembly productivity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising
a bare cell,
a protective circuit board electrically connected to the bare cell to control the charge/discharge of the bare cell,
a secondary protective device connected between the bare cell and the protective circuit board and installed on one surface of the bare cell,
an insulating member disposed on the one surface of the bare cell and having a width greater than that of the secondary protective device, and
a cover case provided on the bare cell that defines an opening to accommodate the protective circuit board wherein the cover case is formed with interference-preventing holes formed on the cover case adjacent the one surface of the bare cell where the insulating member is disposed.

2. The battery pack of claim 1, wherein the insulating member is smaller in width than the one surface of the bare cell.

3. The battery pack of claim 2, wherein the width of the insulating member is at least 51% of the one surface of the bare cell.

4. The battery pack of claim 1, wherein the insulating member has the same width as the one surface of the bare cell.

5. The battery pack of claim 1, wherein the insulating member is greater in width than the one surface of the bare cell.

6. The battery pack of claim 5, wherein the width of the insulating member is 109% or less than that of the one surface of the bare cell.

7. The battery pack of claim 1, wherein the insulating member is in the form of a tape.

8. The battery pack of claim 1, wherein the bare cell is formed with an area on the one surface thereof where the insulating member is disposed.

9. The battery pack of claim 8, wherein the area is a recessed portion whose width is smaller than that of the one surface of the bare cell.

10. The battery pack of claim 8, wherein the area is a stepped portion whose width is the same as that of the one surface of the bare cell.

11. The battery pack of claim 1, wherein the bare cell has an open surface closed by a cap plate.

12. The battery pack of claim 1, further comprising a label surrounding the side surfaces of the bare cell.

13. The battery pack of claim 11, wherein the insulating member protrudes outwardly from both sides of the cap plate through the interference-preventing holes of the cover case.

* * * * *